United States Patent Office 2,933,488
Patented Apr. 19, 1960

2,933,488
HEAVY METAL-CONTAINING AZO DYESTUFFS
Walter Biedermann, Fabio Beffa, and Guido Schetty, Basel, Switzerland, assignors to J. R. Geigy A.-G., Basel, Switzerland, a Swiss firm
No Drawing. Application January 22, 1957
Serial No. 635,084
Claims priority, application Switzerland January 26, 1956
6 Claims. (Cl. 260—145)

The invention concerns heavy metal-containing azo dyestuffs which contain a mono and a disazo dyestuff bound to a co-ordinative hexavalent heavy metal atom. It also concerns processes for the production of such dyestuffs and their use for the dyeing of lacquers, of cellulose ester spinning masses and of material containing protein such as leather, silk, wool, furs, as well as of synthetic polypeptide fibres such as Lanital, superpolyamide and superpolyurethane fibres.

It has been found that very valuable chromium-containing dyestuffs are obtained if a dicyclically co-ordinated, metal-containing azo dyestuff in which each dyestuff molecule is bound to a co-ordinative hexavalent chromium atom, is added in a weakly acid, neutral or alkaline medium to a dicyclic metallising azo dyestuff, these azo dyestuffs being so chosen that the reaction product contains a sulphonated monoazo and an unsulphonated disazo dyestuff (each defined below) bound in complex linkage to one and the same chromium atom.

The o.o'-dihydroxy azo dyestuffs are the preferred dicyclic metallising azo dyestuffs of the present invention. However, also such o-hydroxy azo dyestuffs which contain in the o'-position a substituent which can be exchanged for the hydroxyl group or which can be converted into the hydroxyl group can be used in the production of the metal-containing dyestuffs used according to the present invention which contain a co-ordinative hexavalent chromium atom for each dyestuff molecule. Examples of such dyestuffs are o-hydroxy-o'-halogen azo dyestuffs or o-hydroxy-o'-alkoxy azo dyestuffs. The metal complexes used according to the present invention containing one chromium atom bound in complex linkage to each dyestuff molecule are obtained by methods known per se, for example by reacting excess chromic salts in aqueous or organic solution at a raised temperature, possibly under pressure and preferably in an acid medium. Sulphonated, metallisable azo dyestuffs are metallised preferably in aqueous solution, unsulphonated metallisable dyestuffs in higher boiling alcohols such as e.g. ethylene glycol and monoalkylesters thereof at temperatures of from 90–150° C. Also, in sulphonated metal complex dyestuffs, the sulphonic acid groups can be split off either during or after the complex formation. This can be done for example with the chromium complexes of 2 - (o' - hydroxyarylazo) - 1 - hydroxynaphthalene - 4-sulphonic acids. Depending on the method of production and the reaction medium, the so-called 1:1 complex of a metallisable azo dyestuff containing one chromium atom for each dyestuff molecule to be added to the metal-free azo dyestuff can contain still further atoms or groups attached at the heavy metal atom. For example aquo, acido, hydroxo complexes of the metal-containing dyestuffs can be formed and used. The 1:1 complex can even contain chelated attached atoms or groups which can be displaced by the dicyclically chelating second azo dyestuff, such as occurs for example in the salicylato or tartrato compounds of metal-containing monoazo dyestuffs containing one chromium atom to each dyestuff molecule. The heavy metal-containing dyestuff to be used is preferably a sulphonated monoazo dyestuff; the use of heavy metal-containing disazo dyestuffs however, is not excluded. The sole reason for the preference of metal-containing monoazo dyestuffs is the more easy accessibility of their 1:1 metal complexes.

The sulphonated monoazo dye used in the present process is the coupling product of a diazotised 1.2-aminonaphthol-4-sulphonic acid which may be substituted in 6-position by halogen or a nitro group, with an unsulphonated hydroxynaphthalene compound coupling in o-position to a hydroxyl group. Examples of unsulphonated disazo dyestuffs useful in the instant invention are the compounds formed from diazotised 4- or 5-arylazo-2-amino-1-hydroxybenzene compounds and naphthols coupling in o-position to a hydroxyl group. The coupling or end component respectively in the mono and disazo dyestuffs and also the starting diazo component of the disazo dyes used can contain further substituents usual in azo dyestuffs, for example, halogen, alkyl, alkoxy, nitro, acylamino, sulphonic acid amide, alkyl sulphonyl, aryl sulphonyl, acyl substituents. Of particular advantage for water soluble textile dyestuffs of the type according to the present invention is the presence of one sulphonic acid group only.

The metal-free azo dyestuff which is added to the chromium-containing azo dyestuff may be only partly soluble in water. The addition is performed advantageously in aqueous solution at medium temperatures, e.g. of 40–95° C. and in the presence of alkaline agents or agents which buffer the mineral acid, e.g. in the presence of sodium acetate, sodium carbonate, sodium hydroxide, etc. or in the presence of corresponding lithium, potassium or ammonium compounds. It can also be performed in aqueous or anhydrous lower alcohols such as ethyl alcohol, ethylene glycol, ethylene glycol monomethyl, monoethyl or monobutyl ethers. Under favourable conditions, the metal-free azo dyestuff is incorporated relatively quickly and completely.

The new metal-containing dyestuffs can be obtained from an aqueous solution by salting out and from an alcoholic solution by precipitation with water or by distilling off the organic solvent. The process according to the present invention enables deep olive to black metal-containing dyestuffs to be produced; up to now such shades could only be obtained with difficulty from monoazo dyestuffs. In addition it is also particularly advantageous that sulphonated chromium-containing textile dyestuffs can be produced which are distinguished by good neutral drawing power on to wool, very good wet fastness of the wool dyeings, interesting deep shades and relatively very good fastness to light.

The particularly valuable black wool dyestuffs of the present invention correspond to the formula I:

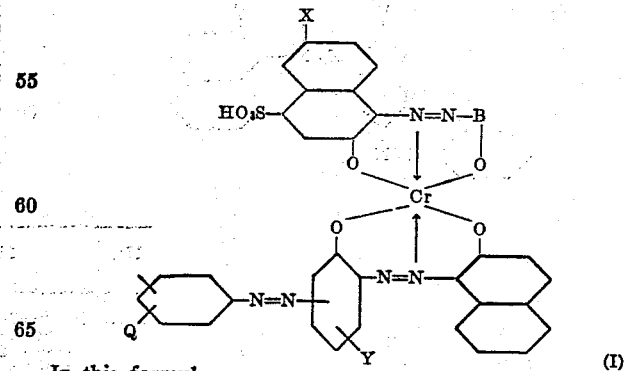

(I)

In this formula
B represents a 1.2-naphthylene radical,
X represents H, $NO_2$ or halogen,
Y represents H, $CH_3$ or $OCH_3$, and
Q and Z each represent hydrogen, halogen, lower alkyl or lower alkoxy, nitro or sulphonic acid amide groups.

The water soluble textile dyestuffs according to the present invention which contain one sulphonic acid substituent only which confers a sufficient water solubility are suitable not only for the dyeing of wool from a weakly alkaline, neutral to weakly acid bath in deep shades, but are also suitable for the dyeing of leather, furs, casein, superpolyamide and superpolyurethane fibres or of paper. They can also be used for the dyeing of lacquers and cellulose spinning masses.

The following examples illustrate the invention. Where not otherwise stated, parts are given as parts by weight and the temperatures are in degrees centigrade. The relationship of parts by weight to parts by volume is as that of kilogrammes to litres.

EXAMPLE 1

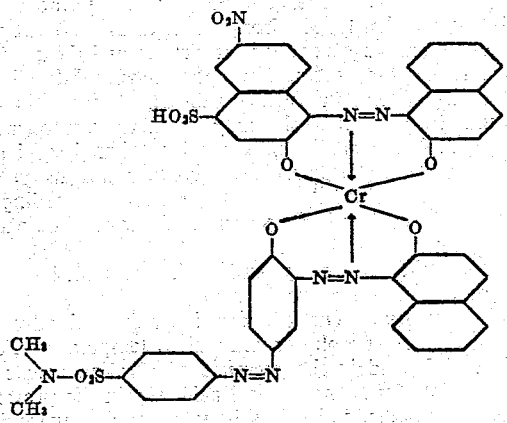

10 parts of 2 N-caustic soda lye and 4.83 parts of the disazo dyestuff from diazotised 3-amino-4-hydroxyazobenzene-4'-sulphonic acid dimethylamide and 2-hydroxynaphthalene are added to 150 parts of water. Also the complex chromium compound of the type 1 chromium atom: 1 dyestuff molecule, corresponding to 0.52 part of chromium and 4.39 parts of the dyestuf from nitrated 1-diazo-2-hydroxy-naphthalene-4-sulphonic acid→2-hydroxynaphthalene, is added. The whole is boiled for 2½ hours and then evaporated to dryness. The dyestuff is a black powder; it dyes wool in black shades which have good fastness to wet and light.

EXAMPLE 2

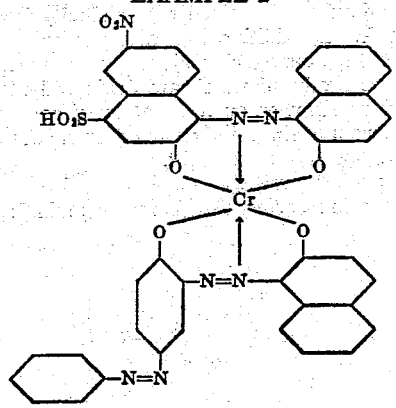

3.68 parts of the disazo dyestuff from diazotised 3-amino-4-hydroxy-1.1'-azobenzene and 2-hydroxynaphthalene and the complex chromium compound of the type 1 chromium atom: 1 dyestuff molecule, corresponding to 0.52 part of chromium and 4.39 parts of the dyestuff from 6-nitro-1-amino-2-hydroxynaphthalene-4-sulphonic acid→2-hydroxynaphthalene, are pasted in 200 parts of water, 20 parts by volume of 2 N-caustic soda lye are added and the whole is heated for 2 hours at 90–95°. The reaction product is then precipitated by the addition of sodium chloride, filtered off and dried. A dark, water soluble powder is obtained which dyes wool, nylon and silk from a neutral or weakly acid bath in black shades. The dyeings have good fastness to light. The dyestuff is also suitable for the dyeing of leather.

EXAMPLE 3

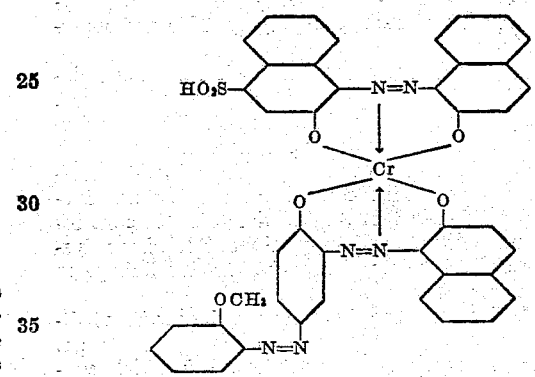

3.98 parts of the disazo dyestuff from diazotised 3-amino-4-hydroxy-2'-methoxy-1.1'-azobenzene and 2-hydroxynaphthalene and 4.44 parts of the complex chromium compound of the type 1 chromium atom: 1 dyestuff molecule which corresponds to 0.52 part of chromium and 3.94 parts of the monoazo dyestuff from diazotised 1-amino-2-hydroxynaphthalene-4-sulphonic acid and 2-hydroxynaphthalene are dissolved in 200 parts of water. 20 parts by volume of 2 N-caustic soda lye are added and the solution is stirred for 2 hours at 90–95°. The reaction product is then precipitated by the addition of 20 parts of sodium chloride, filtered off and dried. A dark, water soluble powder is obtained which dyes wool, silk and synthetic polypeptide fibres from a neutral to weakly acid bath in black shades. The dyeings have good fastness to light. The dyestuff is also suitable for the dyeing of leather.

The following table contains further dyestuffs according to the present invention which are obtained by the methods described in the above examples if the complex metal compound of the type 1 heavy metal atom : 1 dyestuff molecule given in column I is reacted with the metal-free dyestuff shown in column II:

*Table*

| No. | Metal complex I | | Metal-free dyestuff II | Dyeing on wool or leather |
|---|---|---|---|---|
| 1 | 1-amino-2-hydroxynaphthalene-4-sulfonic acid ⟶ 2-hydroxynaphthalene. | Cr | 3-amino-4-hydroxyazobenzene ⟶ 2-hydroxynaphthalene. | black. |
| 2 | ....do............ | Cr | 3-amino-4-hydroxy-2'-methylazobenzene ⟶ 2-hydroxynaphthalene. | Do. |
| 3 | ....do............ | Cr | 3-amino-4-hydroxy-2'-ethylazobenzene ⟶ 2-hydroxynaphthalene. | Do. |
| 4 | ....do............ | Cr | 3-amino-4-hydroxy-4'-methylazobenzene ⟶ 2-hydroxynaphthalene. | Do. |

Table—(Continued)

| No. | Metal complex I | | Metal-free dyestuff II | Dyeing on wool or leather |
|---|---|---|---|---|
| 5 | 1-amino-2-hydroxynaphthalene-4-sulfonic acid ⟶ 2-hydroxynaphthalene. | Cr | 3-amino-4-hydroxy-2′.6′-dimethylazobenzene ⟶ 2-hydroxynaphthalene. | reddish black. |
| 6 | ......do...... | Cr | 3-amino 4 hydroxy-4′-chlorazobenzene ⟶ 2-hydroxynaphthalene. | black. |
| 7 | ......do...... | Cr | 3-amino-4-hydroxy-2′-ethoxyazobenzene ⟶ 2-hydroxynaphthalene. | Do. |
| 8 | ......do...... | Cr | 3-amino-4-hydroxy-3′-nitroazobenzene ⟶ 2-hydroxynaphthalene. | Do. |
| 9 | ......do...... | Cr | 3-amino-4-hydroxy-2′.4′-dimethylazobenzene ⟶ 2-hydroxynaphthalene. | Do. |
| 10 | 6-nitro-1-amino-2-hydroxynaphthalene-4-sulphonic acid ⟶ 1-hydroxynaphthalene. | Cr | 3-amino-4-hydroxyazobenzene ⟶ 2-hydroxynaphthalene. | Do. |
| 11 | ......do...... | Cr | 3-amino 4-hydroxy-2′-methoxyazobenzene ⟶ 2-hydroxynaphthalene. | Do. |
| 12 | 1-amino-2-hydroxynaphthalene-4-sulphonic acid ⟶ 1-hydroxynaphthalene. | Cr | 3-amino-4-hydroxyazobenzene ⟶ 2-hydroxynaphthalene. | Do. |
| 13 | ......do...... | Cr | 3-amino-4-hydroxy-2′-methoxyazobenzene ⟶ 2-hydroxynaphthalene. | Do. |
| 14 | 6-nitro-2-hydroxy-1-aminonaphthalene-4-sulphonic acid ⟶ 2-hydroxynaphthalene. | Cr | 3-hydroxy-4-amino-6-methylazobenzene ⟶ 2-hydroxynaphthalene. | Do. |
| 15 | ......do...... | Cr | 3-hydroxy-4-amino-6-methyl-4′-chlorazobenzene ⟶ 2-hydroxynaphthalene. | Do. |
| 16 | 2-hydroxy-1-aminonaphthalene-4-sulphonic acid ⟶ 2-hydroxynaphthalene. | Cr | 3-hydroxy-4-amino-6-methyl-4′-nitroazobenzene ⟶ 2-hydroxynaphthalene. | Do. |
| 17 | o-aminophenol-4-methyl sulphone ⟶ 1-(3-chlorophenyl)-3-methyl-5-pyrazolone. | Cr | 3-hydroxy-4-amino-6-methyl-3′-carboxyazobenzene ⟶ 2-hydroxynaphthalene. | brown. |
| 18 | ......do...... | Cr | 3-hydroxy-4-amino-6-methyl-4-sulphamidoazobenzene ⟶ 2-hydroxynaphthalene. | olive. |
| 19 | 3-hydroxy-4-amino-6-methyl-2′.4′-dimethyl-6′-sulphoazobenzene ⟶ 2-hydroxynaphthalene. | Cr | 4-nitro-2-amino-1-hydroxybenzene ⟶ 2-hydroxynaphthalene. | black. |
| 20 | 3-hydroxy-4-amino-6-methoxyazobenzene ⟶ 2-hydroxynaphthalene. | Cr | 2-amino-1-hydroxybenzene-4-sulphonic acid ⟶ 2-hydroxynaphthalene. | Do. |
| 21 | 3-hydroxy-4-amino-6-methoxy-4′-sulphoazobenzene ⟶ 2-hydroxynaphthalene. | Cr | 4-chloro-2-amino-1-hydroxybenzene ⟶ 2-hydroxynaphthalene. | Do. |
| 22 | 3-hydroxy-4-amino-6-methoxy-3′-sulphoazobenzene ⟶ 2-hydroxynaphthalene. | Cr | 4-nitro-2-amino-1-hydroxybenzene ⟶ 2-hydroxynaphthalene. | Do. |
| 23 | 4-methoxy-2-amino-1-hydroxybenzene ⟶ 1-hydroxynaphthalene-3-sulphonic acid. | Cr | 3-amino-4-hydroxyazobenzene ⟶ 1-phenyl-3-methyl-5-pyrazolone. | brown. |
| 24 | 4-nitro-2-amino-1-hydroxybenzene ⟶ 2-hydroxynaphthalene. | Cr | 2.6-diamino-1-hydroxybenzene-4-sulphonic acid ⇌ 2-hydroxynaphthalene. | black. |
| 25 | 6-nitro-1-amino-2-hydroxynaphthalene-4-sulphonic acid ⟶ 2-hydroxynaphthalene. | Cr | 2-hydroxy-3-amino-5-methylazobenzene ⟶ 2-hydroxynaphthalene. | Do. |
| 26 | 4-chloro-5-nitro-2-aminophenol-6-sulphonic acid ⟶ 2-hydroxynaphthalene. | Cr | 4-hydroxy-3-aminoazobenzene ⟶ 2-hydroxynaphthalene. | Do. |
| 27 | 5-nitro-2-amino-1-hydroxybenzene ⟶ 2-hydroxynaphthalene. | Cr | 5-nitro-2-amino-1-hydroxybenzene ⟶ 1-phenylazo-2-amino-5-hydroxynaphthalene-7-sulphonic acid. | blue-black. |
| 28 | 4-chloro-2-amino-1-hydroxybenzene ⟶ 2-hydroxynaphthalene. | Cr | 5-nitro-2-amino-1-hydroxybenzene ⟶ 1-(4′-chlorophenylazo)-2-amino-5-hydroxynaphthalene-7-sulphonic acid. | Do. |
| 29 | ......do...... | Cr | aniline —a→ 1-amino-2-methoxynaphthalene-6-sulphonic acid —alk→ 2-hydroxynaphthalene (demethylated). | Do. |
| 30 | 4-fluoro-2-amino-1-hydroxybenzene ⟶ 2-hydroxynaphthalene. | Cr | 5-nitro-2-amino-1-hydroxybenzene ⟶ 1-phenylazo-2-amino-5-hydroxynaphthalene-7-sulphonic acid. | Do. |
| 31 | 4-bromo-2-amino-1-hydroxybenzene ⟶ 2-hydroxynaphthalene. | Cr | 5-nitro-2-amino-1-hydroxybenzene ⟶ 2-phenylazo-1-amino-8-hydroxynaphthalene-4-sulphonic acid. | greenish-black. |

Table—(Continued)

| No. | Metal complex I | | Metal-free dyestuff II | Dyeing on wool or leather |
|---|---|---|---|---|
| 32 | 4-methyl-2-amino-1-hydroxybenzene ⟶ 2-hydroxynaphthalene. | Cr | 6-nitro-4-methyl-2-amino-1-hydroxybenzene ⟶ 1-phenylazo-2-amino-5-hydroxynaphthalene-7-sulphonic acid. | blue-black. |
| 33 | 6-chloro-1-amino-2-hydroxynaphthalene-4-sulphonic acid ⟶ 2-hydroxynaphthalene. | Cr | 3-amino-4-hydroxy-2'-methoxyazobenzene ⟶ 2-hydroxynaphthalene. | black. |
| 34 | 6-bromo-1-amino-2-hydroxynaphthalene-4-sulphonic acid ⟶ 2-hydroxynaphthalene. | Cr | 3-amino-4-hydroxyazobenzene ⟶ 2-hydroxynaphthalene. | Do. |

EXAMPLE 4

2 parts of the chromium-containing dyestuff according to Example 5 are dissolved in 4000 parts of water and 100 parts of previously well wetted wool are entered into the dyebath at 40–50°.

2 parts of 40% acetic acid are added, the bath is brought to the boil within half an hour and kept boiling for 45 minutes. The wool is rinsed in cold water and dried. The black wool dyeing has good wet and light fastness properties.

A wool dyeing with good properties is also obtained if dyeing is performed in a liquor containing Glaubers salts.

EXAMPLE 5

5 parts of the dyestuff according to Example 3 are dissolved in 4000 parts of water and 100 parts of damped wool are entered at 40–50°. The bath is brought to the boil within half an hour and kept at the boil for 45 minutes. The wool is rinsed in cold water and dried. The black dyeing obtained has good fastness properties.

What we claim is:

1. A complex chromium compound which in the free acid state corresponds to the formula:

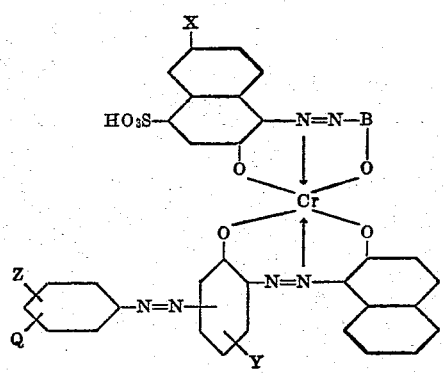

wherein

B represents a 1.2-naphthylene radical,
X represents a member selected from the group consisting of H, $NO_2$ and halogen,
Y represents a member selected from the group consisting of H, $CH_3$ and $OCH_3$, and
Z and Q each represent a member selected from the group consisting of hydrogen, halogen, nitro, lower alkyl and lower alkoxy.

2. A dyestuff which in the free acid state corresponds to the formula:

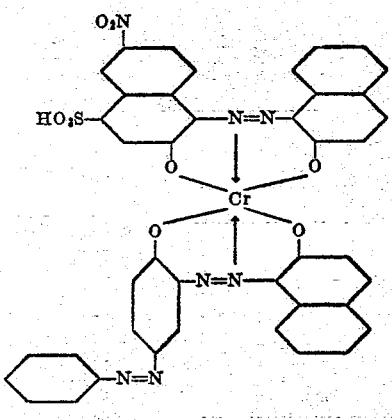

3. A dyestuff which in the free acid state corresponds to the formula:

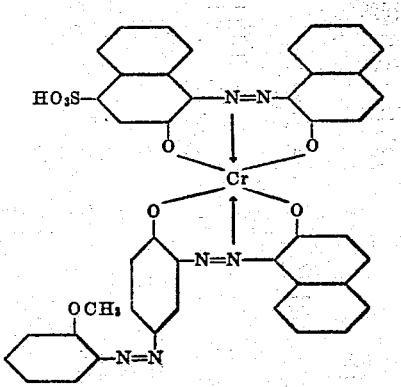

4. A dyestuff which in the free acid state corresponds to the formula:

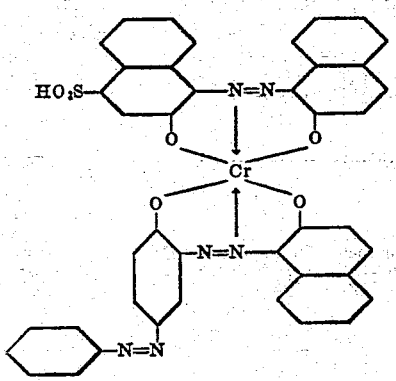

5. A dyestuff which in the free acid state corresponds to the formula:
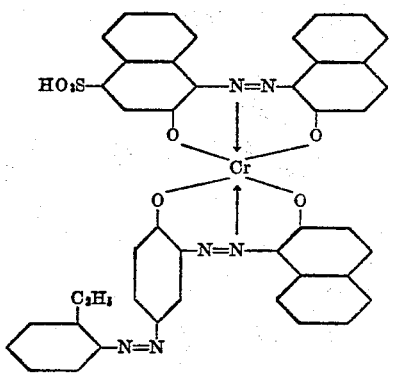
6. A dyestuff which in the free acid state corresponds to the formula:
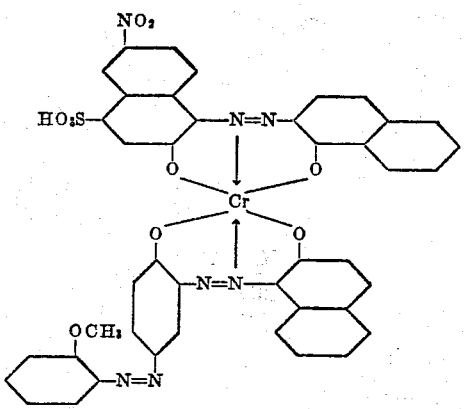
References Cited in the file of this patent
UNITED STATES PATENTS
| | | |
|---|---|---|
| 1,887,602 | Straub et al. | Nov. 15, 1932 |
| 2,673,199 | Widmer et al. | Mar. 23, 1954 |
| 2,775,581 | Neier et al. | Dec. 25, 1956 |
OTHER REFERENCES
Lubs: "Chemistry of Synthetic Dyes and Pigments," 1955, p. 135.